United States Patent
Lehner

(10) Patent No.: US 11,962,210 B2
(45) Date of Patent: Apr. 16, 2024

(54) STATOR AND METHOD FOR PRODUCING A STATOR

(71) Applicant: Schaeffler Technologies AG & Co. KG, Herzogenaurach (DE)

(72) Inventor: Valentin Lehner, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 339 days.

(21) Appl. No.: 17/602,800

(22) PCT Filed: Apr. 9, 2020

(86) PCT No.: PCT/DE2020/100290
§ 371 (c)(1),
(2) Date: Oct. 11, 2021

(87) PCT Pub. No.: WO2020/221393
PCT Pub. Date: Nov. 5, 2020

(65) Prior Publication Data
US 2022/0158516 A1   May 19, 2022

(30) Foreign Application Priority Data

May 2, 2019 (DE) .......................... 102019111340.7

(51) Int. Cl.
*H02K 3/50* (2006.01)
*H02K 5/22* (2006.01)

(52) U.S. Cl.
CPC .............. *H02K 3/50* (2013.01); *H02K 5/225* (2013.01); *H02K 2203/09* (2013.01)

(58) Field of Classification Search
CPC ....... H02K 3/50; H02K 5/225; H02K 2203/09
USPC .......................................................... 310/71
See application file for complete search history.

(56) References Cited

U.S. PATENT DOCUMENTS

| 2012/0098363 | A1  | 4/2012 | Elser et al. |
| 2017/0093239 | A1* | 3/2017 | Teranishi ................. H02K 3/28 |

FOREIGN PATENT DOCUMENTS

| DE | 10328720      | 1/2005  |
| DE | 202014003844  | 7/2014  |
| DE | 202014010565  | 1/2016  |
| DE | 102015209225  | 11/2016 |
| DE | 102016204935  | 9/2017  |
| DE | 102016210927  | 12/2017 |
| DE | 102016222611  | 5/2018  |
| DE | 102016224526  | 6/2018  |
| DE | 102017216084  | 3/2019  |

* cited by examiner

*Primary Examiner* — Terrance L Kenerly
(74) *Attorney, Agent, or Firm* — Volpe Koenig

(57) ABSTRACT

A stator and a method for producing a stator are provided. For this purpose, a connection element is used which includes multiple busbars and a star bar. The connection element has multiple contact points for the busbars and multiple contact points of the star bar. The connection element surrounds the winding ends of the winding head. The winding ends are bent relative to the contact points of the connection element and contact the contact points electrically, by a bending ridge which is positioned on the connection element.

13 Claims, 8 Drawing Sheets

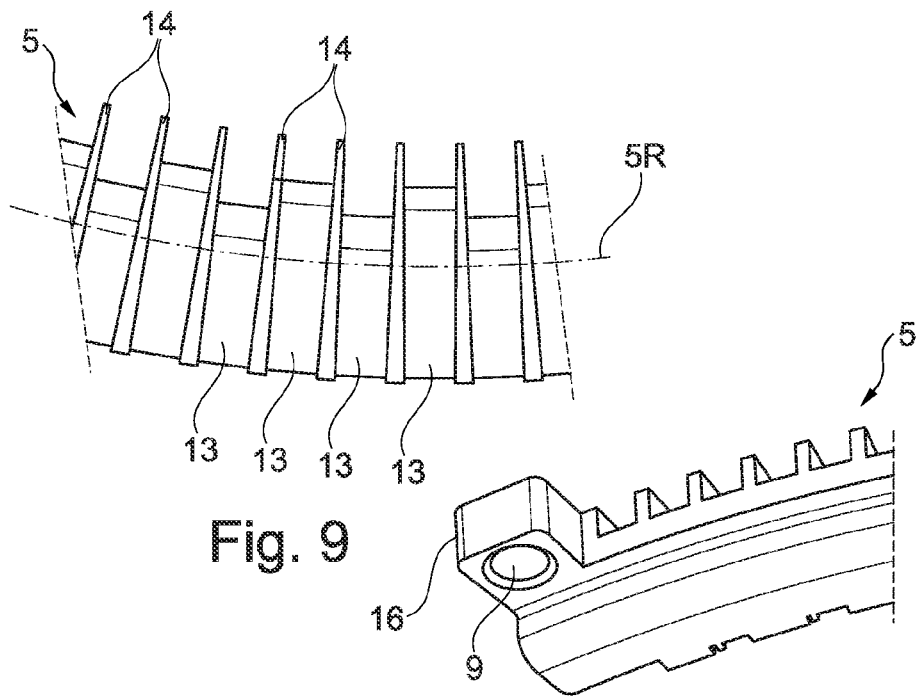
Fig. 9
Fig. 10
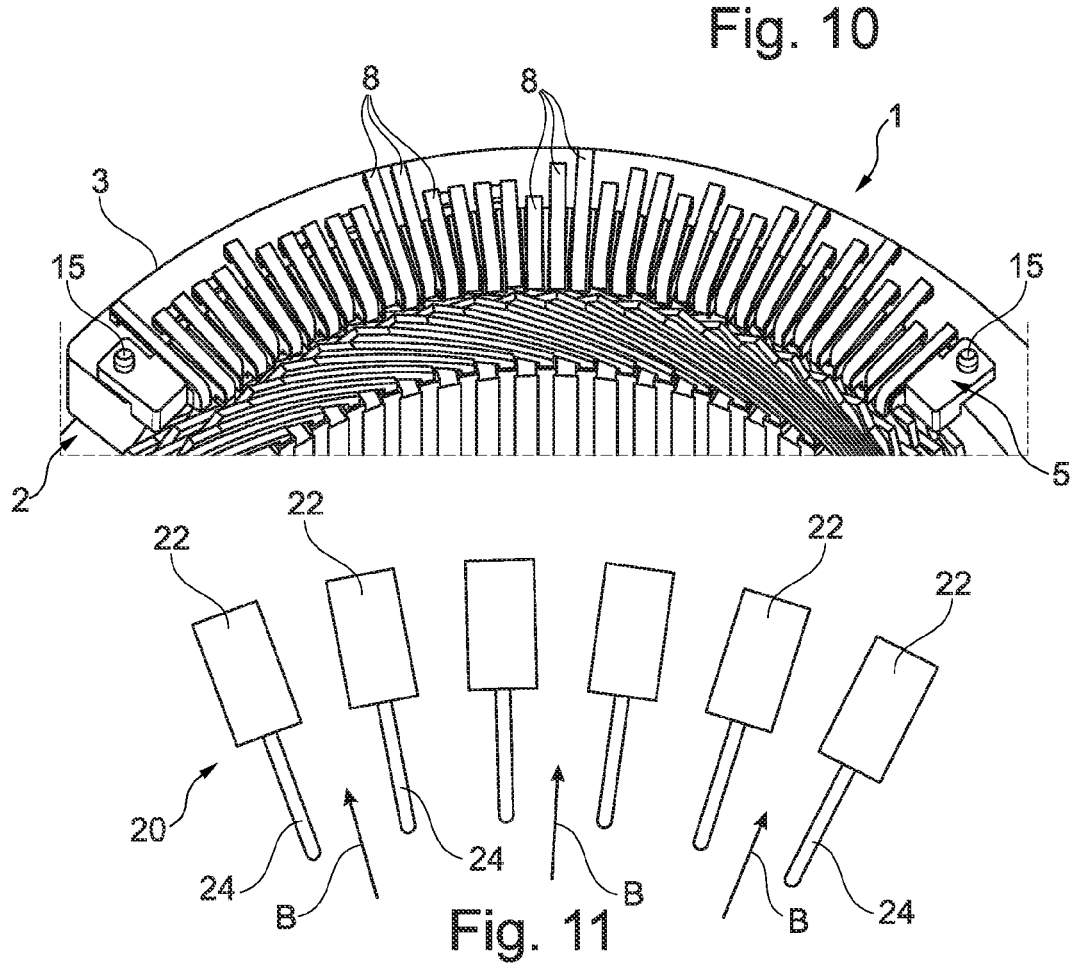
Fig. 11

STATOR AND METHOD FOR PRODUCING A STATOR

CROSS-REFERENCE TO RELATED APPLICATIONS

This application is the U.S. National Phase of PCT Appln. No. PCT/DE2020/100290, filed Apr. 9, 2020, which claims priority to DE 102019111340.7, filed May 2, 2019, the entire disclosures of which are incorporated by reference herein.

TECHNICAL FIELD

The disclosure relates to a stator for an electric motor. The stator has a winding head of a stator winding having a plurality of winding ends.

The disclosure further relates to a method for producing a stator for an electric motor.

BACKGROUND

The German patent specification DE 10 2016 204 935 A1 discloses a wiring plate of a stator of an electric machine. Electrical windings of the stator are contacted with a connector by means of the wiring plate for the power supply. The wiring plate has conductor elements which run in the circumferential direction and connect the windings with connecting sections with flattened cross-sections. The connecting sections are overmolded with an annular plastic body which insulates the conductor elements from one another.

The German patent specification DE 10 2016 210 927 A1 discloses a stator for an electric machine which has winding heads of electric windings arranged in a ring on one end face of a stack of metal sheets. A wiring unit is used to electrically connect winding ends of the windings to the electric phase conductors of a voltage source. The wiring unit has a carrier ring made of an electrically insulating material, which is arranged radially on the outside around the winding heads by means of fixing means. A respective electrically conductive connection element for connecting one of the phase conductors is held by the carrier ring.

The German patent specification DE 10 2016 222 611 A1 discloses a device for interconnecting the wiring of a stator of an electric machine. The device comprises a base body having an underside, wherein the base body can be placed with the underside on a stator. The base body has at least one positioning means for positioning at least one electrical conductor of a line of the stator. The positioning means has an insertion opening. The insertion opening is arranged on the underside of the base body, so that the at least one electrical conductor is inserted through the insertion opening into the positioning means when the device is placed on the stator. The positioning means has a guide section and a connection section, wherein the positioning means is designed such that the at least one electrical conductor is guided into the connection section by means of the guide section when the base body is placed on the stator.

The German patent specification DE 10 2016 224 526 A1 discloses a stator of an electric machine, which consists of a stator core. Each phase includes at least one coil that has a first and a second coil end. A contact device is placed on the face of the laminated stator core for contacting purposes. A routing element and a connection element placed on it serve to interconnect the coil ends with phase connections on a stator face. The coil ends protrude vertically through the feed-through openings of the laying element and are each guided in a radially angled manner along a guide groove of the laying element. The guide grooves each have a constriction in the axial direction, which secures the respective coil end guided in the guide groove against sliding out axially.

The German patent specification DE 10 2017 216 084 A1 discloses a stator for an electric machine which has a stator base body and radial stator teeth for receiving coils of an electrical winding. An insulating plate with receiving pockets for insulation displacement elements is provided on one end face of the stator base body. The coils, which are wound by means of a winding wire, are placed in the receiving pockets. A connection plate has ring-shaped conductors, on each of which multiple insulation displacement elements are arranged, which axially engage in the receiving pockets in order to make electrical contact with the winding wire. The connection plate is made of plastic.

The German utility model DE 20 2014 003 844 U1 discloses a connection assembly that comprises at least three copper profiles. The copper profiles are each bent around a bending axis to form a ring. The copper profiles are insulated with a layer of lacquer, which is removed at predetermined points. At these points spaced-apart connection areas with at least one flat surface for contacting ends of coil wires are formed.

The German utility model DE 20 2014 010 565 U1 discloses a stator of an electric motor with a polyphase, in particular three-phase, stator winding. The coils are provided with an arc-shaped connection unit arranged at the end, wherein the connection unit has a second number of busbars each with a third number of winding and/or contact elements for the coils. The winding and/or contact elements are joined as separate punched elements with a punched strip to form the respective busbar.

For the production of the windings, wave and hairpin windings are pre-bent from individual wire strands of enameled insulation wire (copper or aluminum alloys) using winding templates, or also freely, and then inserted into the stator laminated core of the electric motor. The individual strings are then interconnected depending on the number of phases (2 or more) of the electric motor in the sense of the current flow to generate the stator rotating field with the individual phases and the star point (star conductor) and also with each other. The connection sequence, the number of winding wires and other parameters, such as the wire thickness, the number of stator slots and the number of pole pairs, depend on the design of the electric motor. The individual winding wires are connected, for example welded, to the phases (power supply via, for example, conductor bars), the star conductor and to each other with connecting elements in accordance with the wiring sequence. The respective connections for the interconnection are, for example, individually welded, soldered or the like in multiple work steps.

SUMMARY

The object of the disclosure is therefore to provide a stator for an electric motor in which the production costs and the development effort are reduced, wherein the interconnection of the winding ends should have a uniform structural design and thus enable a fully automated production process with the fewest possible work steps.

This object is achieved by a stator for an electric motor, which comprises one or more of the features disclosed herein.

Another object of the disclosure is to provide a method for producing a stator for an electric motor, in which the production costs, the production process and the development effort for the stator are reduced. A fully automated production process with the fewest possible work steps should be carried out. At the same time, this production process, the implementation of the interconnection and the design of the production systems should be able to be scaled to different electric motors (sizes).

This object is achieved by a method for producing a stator for an electric motor which comprises one or more of the features disclosed herein.

According to one embodiment of the disclosure, a stator for an electric motor comprises an winding head of a stator winding which has a plurality of winding ends. A connection element comprises multiple busbars and a star bar. Multiple contact points of the busbars and contact points of the star bar protrude from the busbars in the axial direction of the stator. The connection element surrounds the winding ends of the winding head. A bending ridge is positioned on the connection element. The winding ends are bent relative to the bending ridge to the contact points of the connection element. The winding ends make electrical contact with the contact points.

The design of the stator according to the disclosure is advantageous because it reduces the production costs, the production process and the development effort for a stator. Especially for stators with particularly efficient winding technologies, such as wave windings and hairpin windings, the stator according to the disclosure enables a fully scalable and automated production process. Furthermore, the minimal axial structure of the stator is advantageous.

The multiple busbars and the star bar of the connection element are overmolded with an insulation material for electrical insulation. The contact points of the individual busbars protrude beyond the insulation material in the axial direction. The overmolding advantageously results in a reduction in positional tolerances between the busbars and the star bar.

At least one pair of centering pins is formed on the connection element. The corresponding bending ridge can be fixed to the centering pins by means of recesses formed on the connection element.

The winding ends are welded, clamped or soldered to the contact points for a permanent electrical connection.

An attachment sits on the bending ridge. An insulation material is provided in the attachment in order to achieve electrical insulation of the winding ends that are electrically connected to the contact points. The bending ridge with attachment that remains on the connection element after casting has the advantage that electrical insulation of the contact points and the winding ends is achieved.

The winding ends are welded or clamped or soldered to the contact points for a permanent electrical connection.

An attachment sits on the bending ridge and encloses an insulation material that enables electrical insulation between the contact points and the winding ends that are electrically connected to them. The bending ridge and the attachment remain on the stator after the encapsulation with insulation material.

The method according to the disclosure for producing a stator for an electric motor is characterized by the step of placing a connection element on the stator and positioning it in such a way that the connection element surrounds a plurality of winding ends on the winding head of the stator winding of the stator. The connection element itself comprises multiple busbars and a star bar, from which multiple contact points of the busbars and multiple contact points of the star bar protrude in the axial direction of the stator. The winding ends are bent towards the contact points of the busbars or towards the contact points of the star bar of the connection element via a bending ridge that is positioned on the connection element. The contact points of the busbars or the contact points of the star bar are thereby electrically contacted. A bending ridge is positioned on the connection element. The winding ends are bent over the bending ridge and electrically contacted with contact points of the busbars and the contact points of the star bar of the connection element. An attachment is placed on the bending ridge, into which an insulation material is introduced so that electrical insulation between the contact points and the electrically connected winding ends is achieved.

The method according to the disclosure has the advantage that a scalable, uniform production process and production systems are possible. Fully automated production can also be achieved, wherein the assembly steps are reduced. This in turn leads to a reduction in production errors.

According to the disclosure, a simultaneous bending of all winding ends over the bending ridge is carried out with one device. The device has multiple rollers that are moved from the inside in a radial direction outwards over the bending ridge. The winding ends are folded over along a bending radius and in grooves. In addition to the execution of the bending of the winding ends, the bending ridge also serves as insulation from the welding points (contact points) to the winding head and thus remains as a component on the stator or electric motor.

The bent winding ends of the winding head of the stator winding are welded, clamped or soldered to the contact points of the connection element in order to provide a permanent electrical connection.

Each bending frame can be automatically placed and positioned on the connection element. For this purpose, the connection element has formed multiple centering pins which engage in recesses formed on the bending ridge.

An attachment is placed on the bending ridge. An insulation material is placed in the attachment and the bending ridge in order to achieve electrical insulation of the winding ends that are electrically connected to the contact points.

According to the disclosure, the following fully automated production process for the contacting and insulation of the contact points of the busbars and the star bar with the winding ends of the winding head of the stator can be defined. First, the connection element is placed and positioned on the winding head of the stator. The connection element can be glued to the winding head of the stator, for example. The bending ridge is then placed on the connection element. With a specially designed device, all winding ends (wires) are bent simultaneously using the bending ridge. The device can be designed as a roller tool. The connection of the contact points to the respective winding ends can take place, for example, radially from the outside by laser welding the individual contact points. Before inserting the attachment (casting frame), a contact test of all welding points at the contact points is carried out. Ultimately, an insulation material is poured into the attachment and thus into the bending frame, so that insulation encapsulation of all weld points (contact points) and the winding ends is achieved.

The insulation material can be a synthetic resin or a silicone in order to ensure complete insulation between the angled winding ends (wires). This insulation enables a considerable reduction in the air and creepage distances and consequently further reduces the installation space of the stator. In order to prevent the liquid insulation material from running off between the ribs of the bending ridge when it is poured, the attachment (casting frame) is designed as a negative shape of the bending ridge in this area. As with the bending ridge, the centering pins provided are used to position the attachment during assembly.

BRIEF DESCRIPTION OF THE DRAWINGS

With reference to the accompanying drawings, the disclosure and its advantages will now be explained in more detail by means of exemplary embodiments, without thereby limiting the disclosure to the exemplary embodiment shown. The proportions in the figures do not always correspond to the real proportions, since some shapes are simplified and other shapes are shown enlarged in relation to other elements for better illustration.

FIG. 9 shows an enlarged detailed view of the bending ridge.

FIG. 10 shows an enlarged detailed view of the end of the bending ridge.

FIG. 11 shows a schematic view of the connection element connected to the winding head and the schematic representation of a tool for turning over the winding ends.

FIG. 17 shows an enlarged partial view of the attachment on the connection element with the casting means filled in.

DETAILED DESCRIPTION

Identical reference symbols are used for elements of the disclosure that are the same or have the same effect. Furthermore, for the sake of clarity, only reference symbols are shown in the individual figures that are necessary for the description of the respective figure. The figures merely represent exemplary embodiments without, however, restricting the disclosure to the exemplary embodiments shown.

Figure 1:
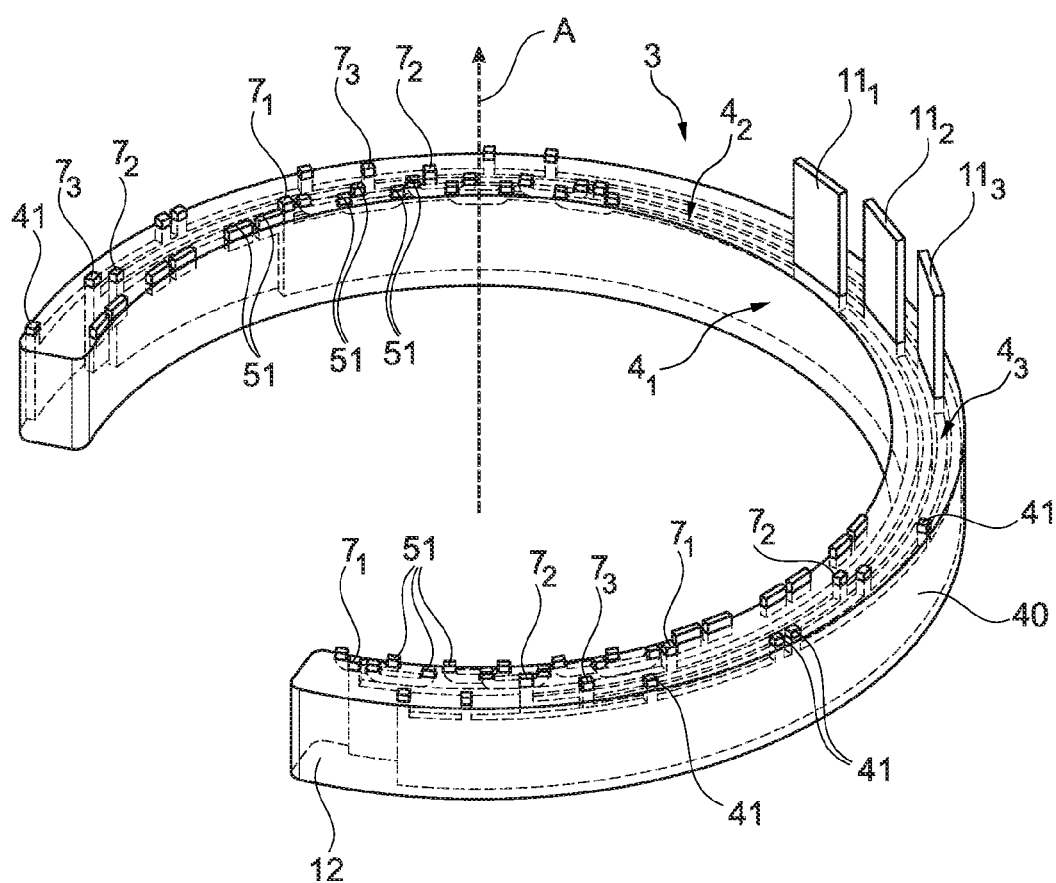
FIG. 1 shows a perspective view of a connection element for the winding ends of a stator.

FIG. 1 shows a perspective view of a connection element 3 for winding ends 8 (see FIG. 4 or 5) on the winding head 2 (see FIG. 2) of a stator 1. The connection element 3 comprises multiple busbars $4_1$, $4_2$ and $4_3$ and a star bar 40. The multiple busbars $4_1$, $4_2$ and $4_3$ and the star bar 40 of the connection element 3 are overmolded with an insulation material 12. The multiple busbars $4_1$, $4_2$ and $4_3$ and the star bar 40 are, for example, overmolded with plastic as an insulation material 12. This ensures electrical insulation between the individual busbars $4_1$, $4_2$ and $4_3$ and the star bar 40 and a fixed positioning of these with respect to one another. The contact points $7_1$, $7_2$ and $7_3$ of the individual busbars $4_1$, $4_2$ and $4_3$, the contact points 41 of the star bar 40 and the connection points 51 protrude beyond the insulation material 12 in the axial direction A. The individual busbars $4_1$, $4_2$ and $4_3$ (three phases) in the embodiment shown here each have corresponding power connections $11_1$, $11_2$ and $11_3$, which can also protrude in the axial direction A from the corresponding busbar $4_1$, $4_2$ and $4_3$ or the star bar 40.

Figure 2:
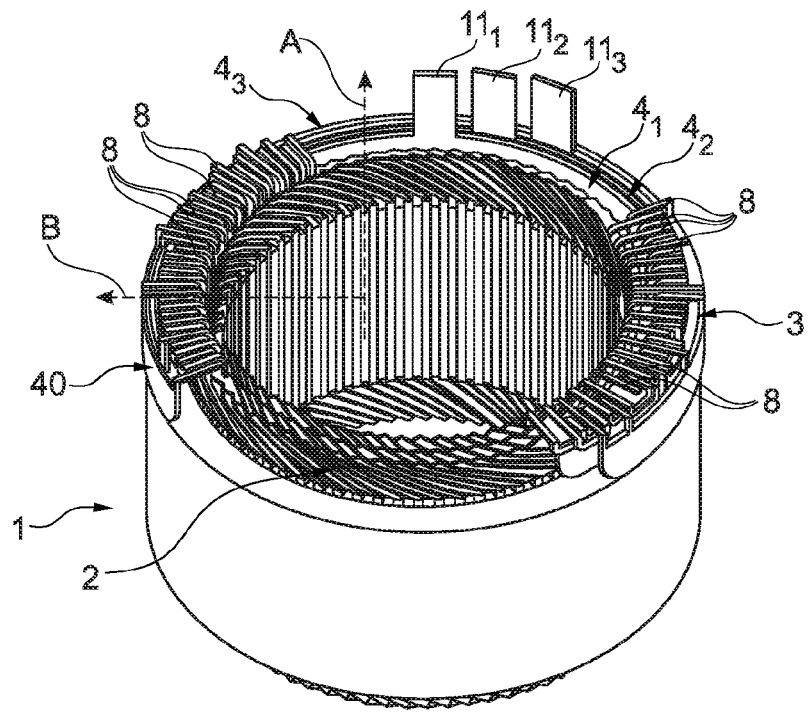
FIG. 2 shows a perspective view of the basic structure of the interconnection of the stator with the connection element, wherein the connection element is not cast.
Figure 3:
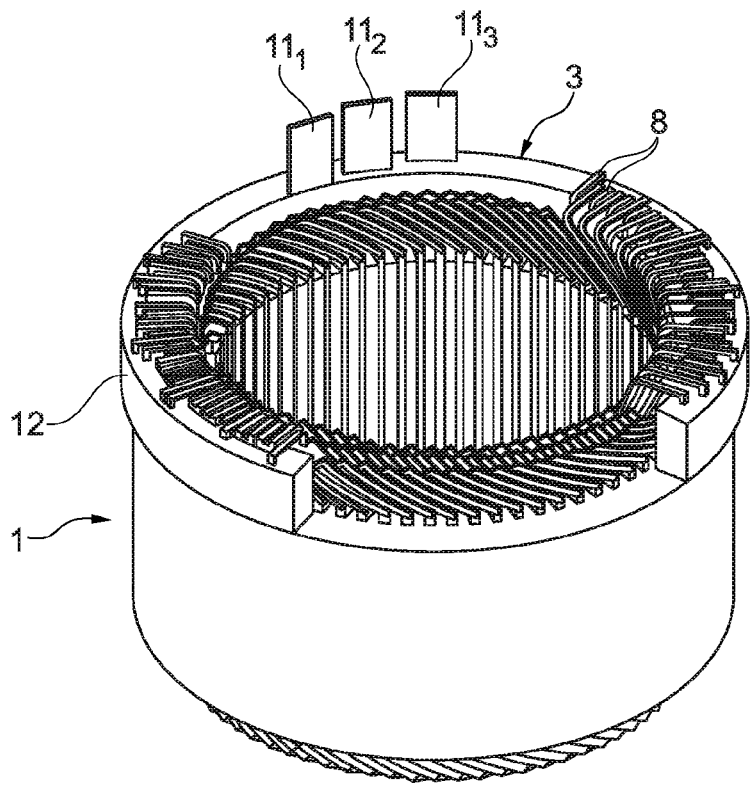
FIG. 3 shows a perspective view of the basic structure of the interconnection of the stator with the connection element, wherein the connection element is cast.

FIG. 2 shows a perspective view of the basic structure of the interconnection of the stator 1 with the connection element 3, wherein the connection element 3 is not cast. FIG. 3 shows a perspective view of the basic structure of the interconnection of the stator 1 with the connection element 3, wherein the connection element 3 is cast. In the representations of FIGS. 2 and 3, the plurality of winding ends 8 are already on the contact points $7_1$, $7_2$ and $7_3$ (see FIG. 1) of the individual busbars $4_1$, $4_2$ and $4_3$ and the contact points 41 (see FIG. 1) of the star bar 40 bent into the end position and thus contact the contact points $7_1$, $7_2$ and $7_3$ or 41. By angling the winding ends 8 on the winding head 2 in the radial direction B (outward), a small structure in the axial direction A of the interconnection of the winding ends 8 can be achieved. In the cast connection element 3, the busbars $4_1$, $4_2$ and $4_3$ and the star bar 40 are completely embedded in the insulation material 12. The connection element 3 is seated on the winding head 2 of the stator 1. Only the power connections $11_1$, $11_2$ and $11_3$ for the individual busbars $4_1$, $4_2$ and $4_3$ are accessible. The winding ends 8 bent onto the contact points 41 (see FIG. 1) of the star bar 40 can also be seen on the contact points $7_1$, $7_2$ and $7_3$ (see FIG. 1) of the individual busbars $4_1$, $4_2$ and $4_3$.

Figure 4:
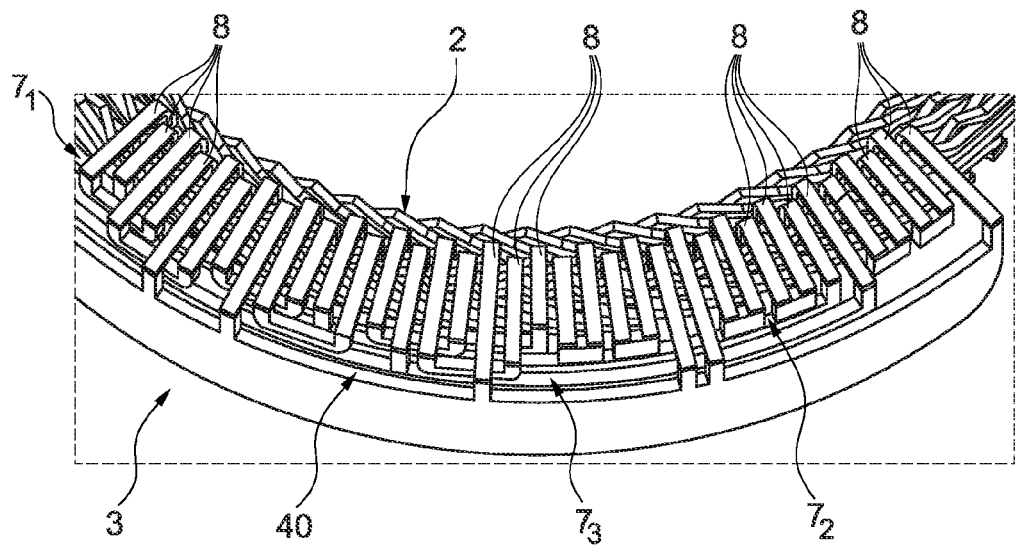
FIG. 4 shows a perspective detailed view of the interconnection of the winding ends of the stator with the connection element, wherein the connection element is not cast.
Figure 5:
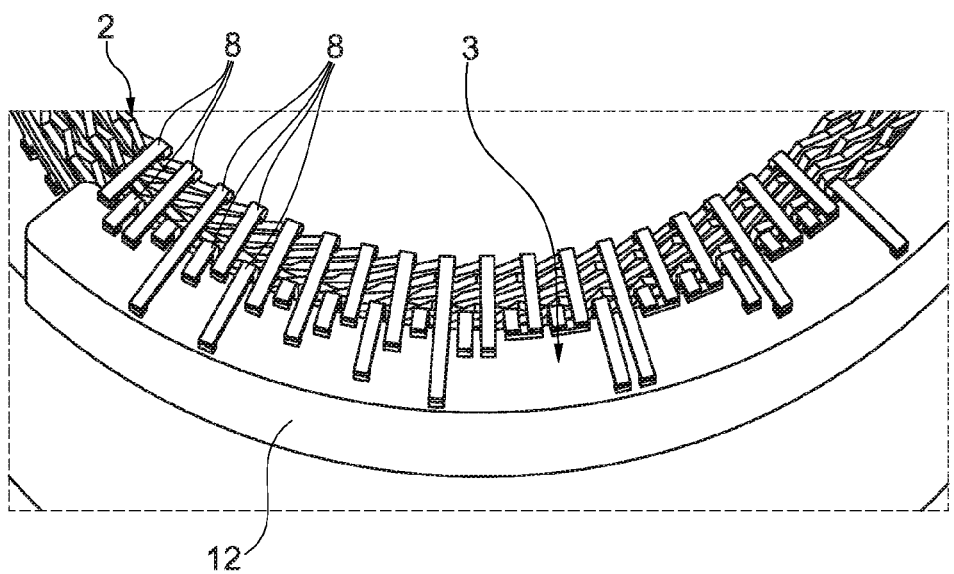
FIG. 5 shows a perspective detailed view of the interconnection of the winding ends of the stator with the connection element, wherein the connection element is cast.

FIG. 4 shows a perspective detailed view of the interconnection of the winding ends 8 of the stator 1 on the connection element 3, wherein the connection element 3 is not cast. FIG. 5 shows a perspective detailed view of the interconnection of the winding ends 8 of the stator 1 with the connection element 3, wherein the connection element 3 is cast. In the detailed representations of FIGS. 4 and 5, the plurality of winding ends 8 are already on the contact points $7_1$, $7_2$ and $7_3$ (see FIG. 1) of the individual busbars $4_1$, $4_2$ and $4_3$ and the contact points 41 (see FIG. 1) of the star bar 40 bent into the end position and thus contact the contact points $7_1$, $7_2$ and $7_3$ or 41. In the connection element 3 coated with the insulation material 12, only the bent winding ends 8 can be seen, which form the contact points $7_1$, $7_2$ and $7_3$ (see FIG. 1) of the individual busbars $4_1$, $4_2$ and $4_3$, the contact points 41 (see FIG. 1) of the star bar 40 and the connection point 51 (see FIG. 1).

Figure 6:
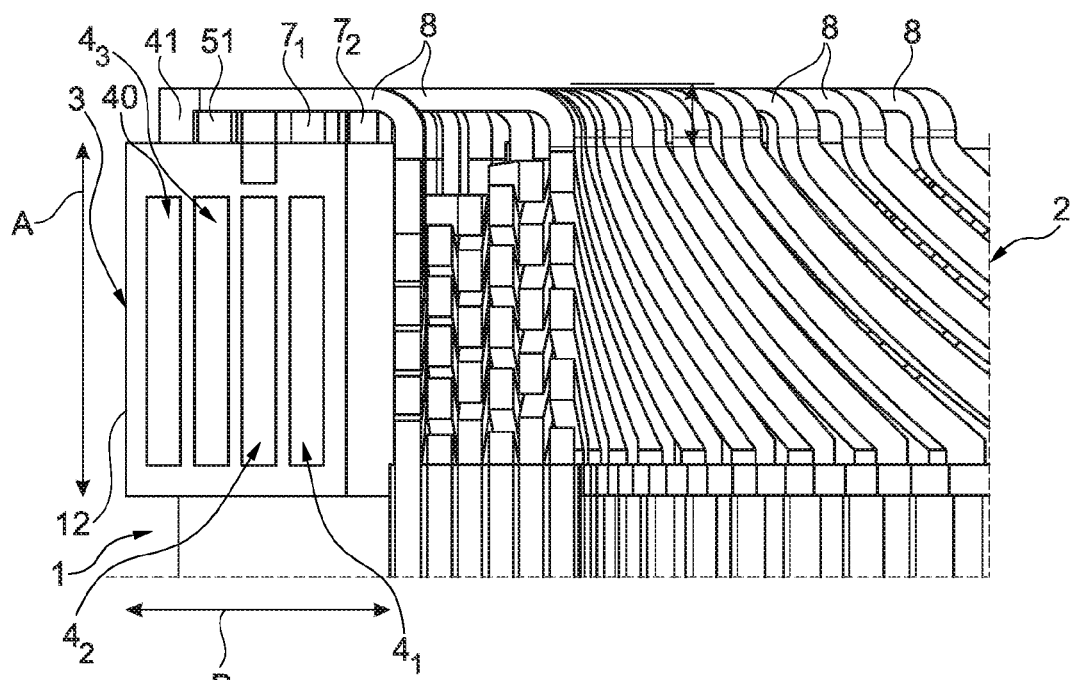
FIG. 6 shows a sectional view of the connection element in connection with the winding head of the stator and the contact made.

FIG. 6 shows a sectional view of the connection element 3 in connection with the winding head 2 of the stator 1 and the contact made. The winding ends 8 are already bent in the end position onto the contact points $7_1$, $7_2$ and $7_3$, the contact points 41 and the connection points 51 and make electrical contact with them. By angling the winding ends 8 outwards in the radial direction B, a small structure in the axial direction A of the interconnection can be achieved. According to the disclosure, a variable scaling (axial/radial) is possible by adapting the busbars $4_1$, $4_2$ and $4_3$ and the star bar 40. The basic structure of the interconnection for construction and production always remains the same and can be implemented quickly. At the same time, the interconnection can be scaled to different requirements and motors and adapted to varying installation space requirements. The busbars $4_1$, $4_2$ and $4_3$, and the star bar 40 are surrounded by the insulation material 12 and are thus able to be fixed to one another and electrically insulated from one another.

Figure 7:
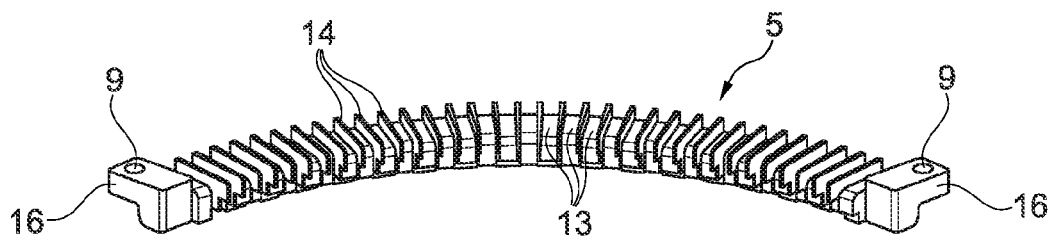
FIG. 7 shows a perspective view of a bending ridge for producing an electrical contact between the winding ends and the contact points of the connection element.

FIG. 7 shows a perspective view of a bending ridge 5 for producing the electrical contact between the winding ends 8 and the contact points $7_1$, $7_2$ and $7_3$, 41 of the connection element 51 (see FIG. 6). The bending ridge 5 has a plurality of grooves 13 and ridge rims 14 separating the grooves 13. The free ends 16 of the bending ridge 5 each have an recess 9. The recess 9 serves to receive a centering pin 15 (see FIG. 8) of the connection element 3 (see FIG. 8).

Figure 8:
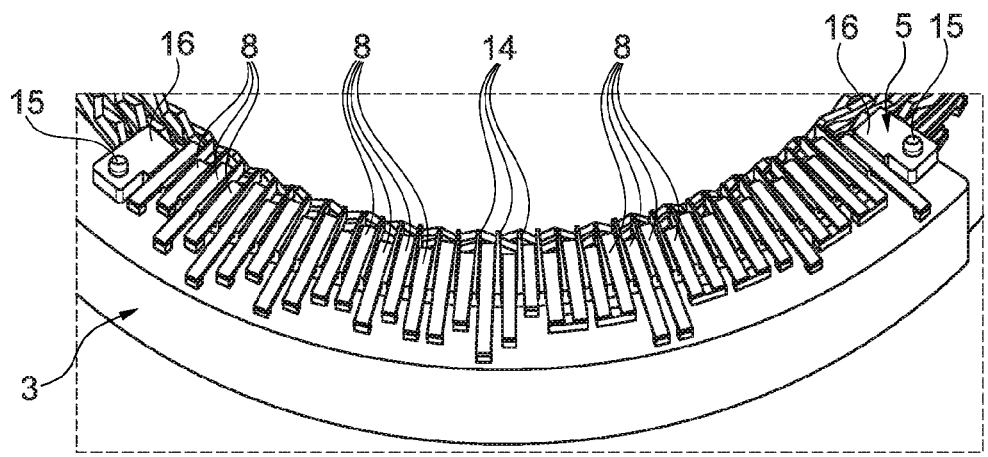
FIG. 8 shows an enlarged view of the connection element with the bending ridge used.

FIG. 8 shows an enlarged view of the connection element 3 with the bending ridge 5 used. The bending ridge 5 is positioned on the connection element 3 via centering pins 15. An exact alignment of the winding ends 8 with respect to the connection element 3 is thus achieved. At the same time, the winding ends 8 are separated from one another and aligned via the ridge rims 14.

FIG. 9 shows an enlarged detailed view of the central part of the bending ridge 5. The overhead grooves 13 on the bending ridge 5 are arranged on a radius 5R. The arrangement of the grooves 13 on the radius 5R results in a spreading of the individual winding ends 8 towards the respective contact points $7_1$, $7_2$ $7_3$ and 41 as well as the connection points 51 (see FIG. 6) for performing the bending of the winding ends 8. As already mentioned in the description of FIG. 8, the ridge rims 14 serve to spatially separate and electrically isolate the winding ends 8 from one another.

FIG. 10 shows an enlarged detailed view of a free end 16 of the bending ridge 5. The recess 9 is formed at the free end and is used for the correct positioning of the bending ridge 5 on the connection element 3 (see FIG. 8). The assembly of the bending ridge 5 on the connection element 3 is carried out, for example, in an automated manner using a robot arm (not shown).

Figure 12:
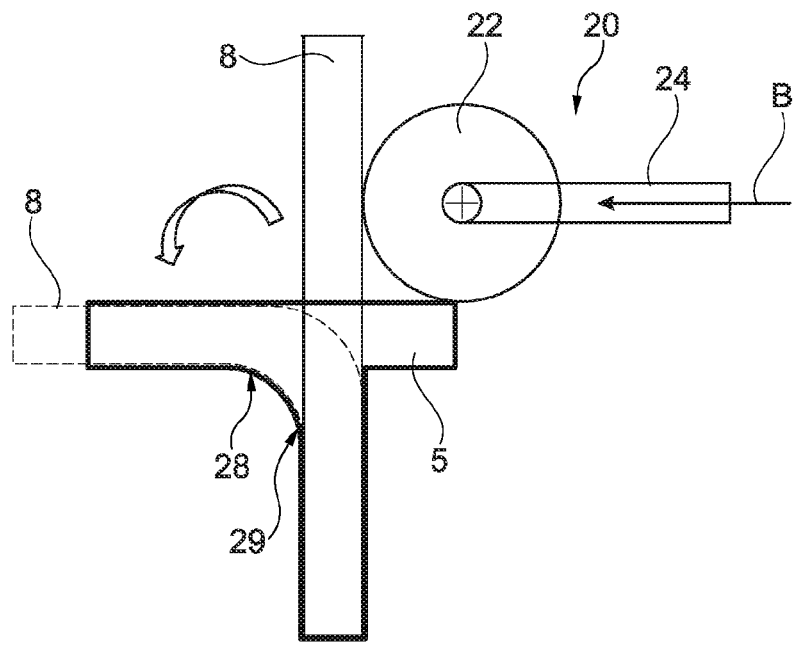
FIG. 12 shows a schematic side view of the device for turning over the winding ends of the winding head of the stator.

FIG. 11 shows a schematic view of the connection element 3 connected to the winding head 2 and the schematic representation of a device 20 for turning over the winding ends 8. FIG. 12 shows a schematic side view of the device for turning over the winding ends 8 of the winding head 2 of the stator 1. The device 20 has multiple rollers 22 which are rotatably mounted and guided on a guide 24. The rollers 22 can be brought into operative connection with the winding ends 8 and press on the winding ends 8. The rollers 22 act in the radial direction B on the winding ends 8, so that they are bent about a bending radius 28 of a respective bending edge 29 of each groove 13 of the bending ridge 5 in the direction of the respective contact points $7_1$, $7_2$ $7_3$ and 41 as well as the connection points 51 (see FIG. 6). The bending carried out by means of the rollers 22 via the bending ridge 5 is carried out from the inside in the radial direction B to the outside. The winding ends 8 are folded over along the bending radius 28 and the grooves 13 (see FIG. 11).

Figure 13:
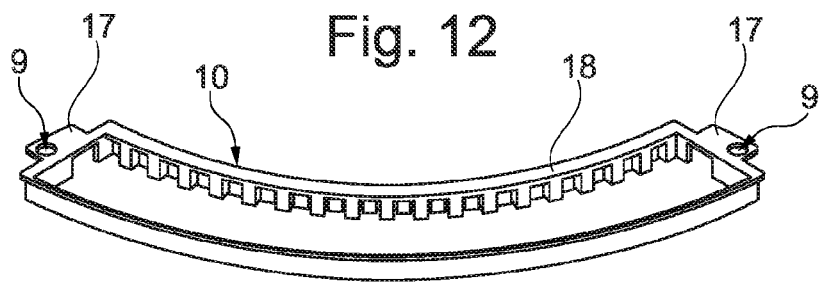
FIG. 13 shows a perspective view of an attachment for casting the ready-to-use winding ends.
Figure 14:
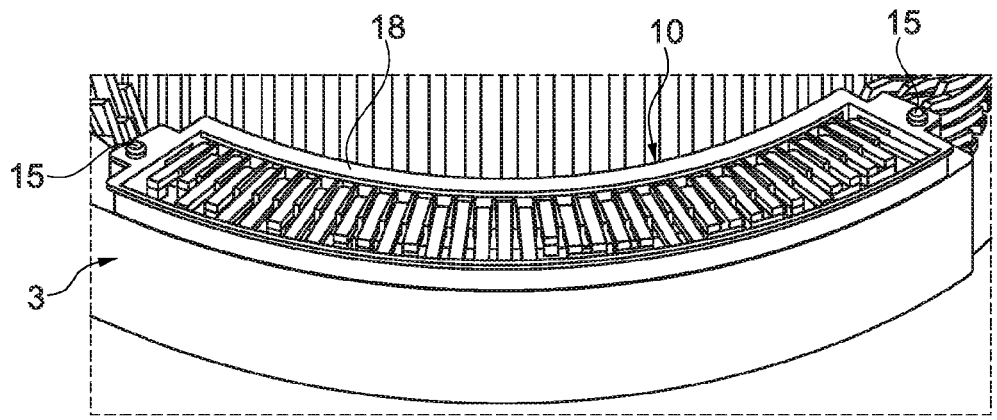
FIG. 14 shows a perspective view of the attachment which surrounds the area of the connection element to be cast.
Figure 15:
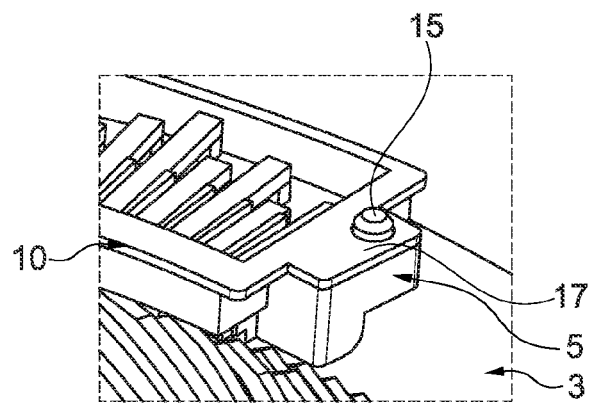
FIG. 15 shows an enlarged partial view of the attachment on the connection element.

FIG. 13 shows a perspective view of an attachment 10 for casting the ready-to-use winding ends 8 in the bending ridge 4. FIG. 14 shows a perspective view of the attachment 10, which surrounds the area of the bending ridge 5 to be cast on the connection element 3. FIG. 15 shows an enlarged partial view of the attachment 10 on the bending ridge 5 of the connection element 3. The attachment 10 defines a casting frame 18 which surrounds the area to be filled with a casting composite 19 (see FIG. 16 or 17). At each free end 17, the casting frame 18 also has an recess 9 (opening) through which the attachment 10 can be mounted on the centering pin 15 of the connection element 3. The casting frame 18 of the attachment 10 has a negative shape of the bending ridge 5, so that a form fit is provided between the casting frame 18 of the attachment 15 and the bending ridge 5. The form fit ensures that no material leaks out during casting. As can be seen from FIG. 14, the attachment 10 is positioned in relation to the bending ridge 5 by the centering pins 15 of the connection element 3. FIG. 15 illustrates the attachment of the attachment 10 to the bending ridge 5. The attachment 10 also has a recess 9 at the free end 17, via which the attachment 10 can be positioned in relation to the bending ridge 5.

Figure 16:
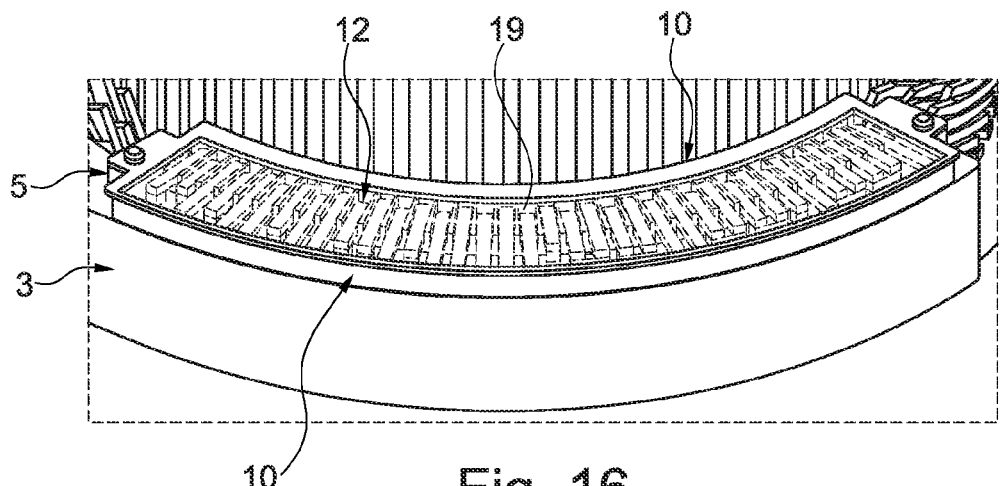
FIG. 16 shows a perspective view of the attachment in which a casting means has already been filled.
Figure 17:
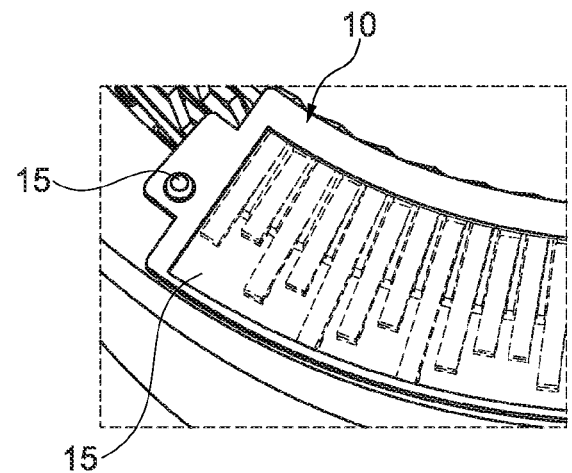

FIG. 16 shows a perspective view of the attachment 10 on the bending ridge 5, in which an insulation material 12 has already been filled as casting 19. FIG. 17 shows an enlarged partial view of the attachment 10 on the bending ridge 5, which sits on the connection element 3. As already mentioned in the description of FIGS. 14 and 15, the attachment 10 is also positioned by means of the centering pins 15 of the connection element 3. The insulation material 12 filled into the attachment 10 and the bending ridge 5 surrounds and covers the contact points $7_1$, $7_2$ $7_3$ and 41 as well as the connection points 51 (see FIG. 6). In this way, protection against environmental influences and electrical insulation of the contact points $7_1$, $7_2$ $7_3$ and 41 as well as the connection points 51 and also the bent winding ends 8 are achieved.

Figure 18:
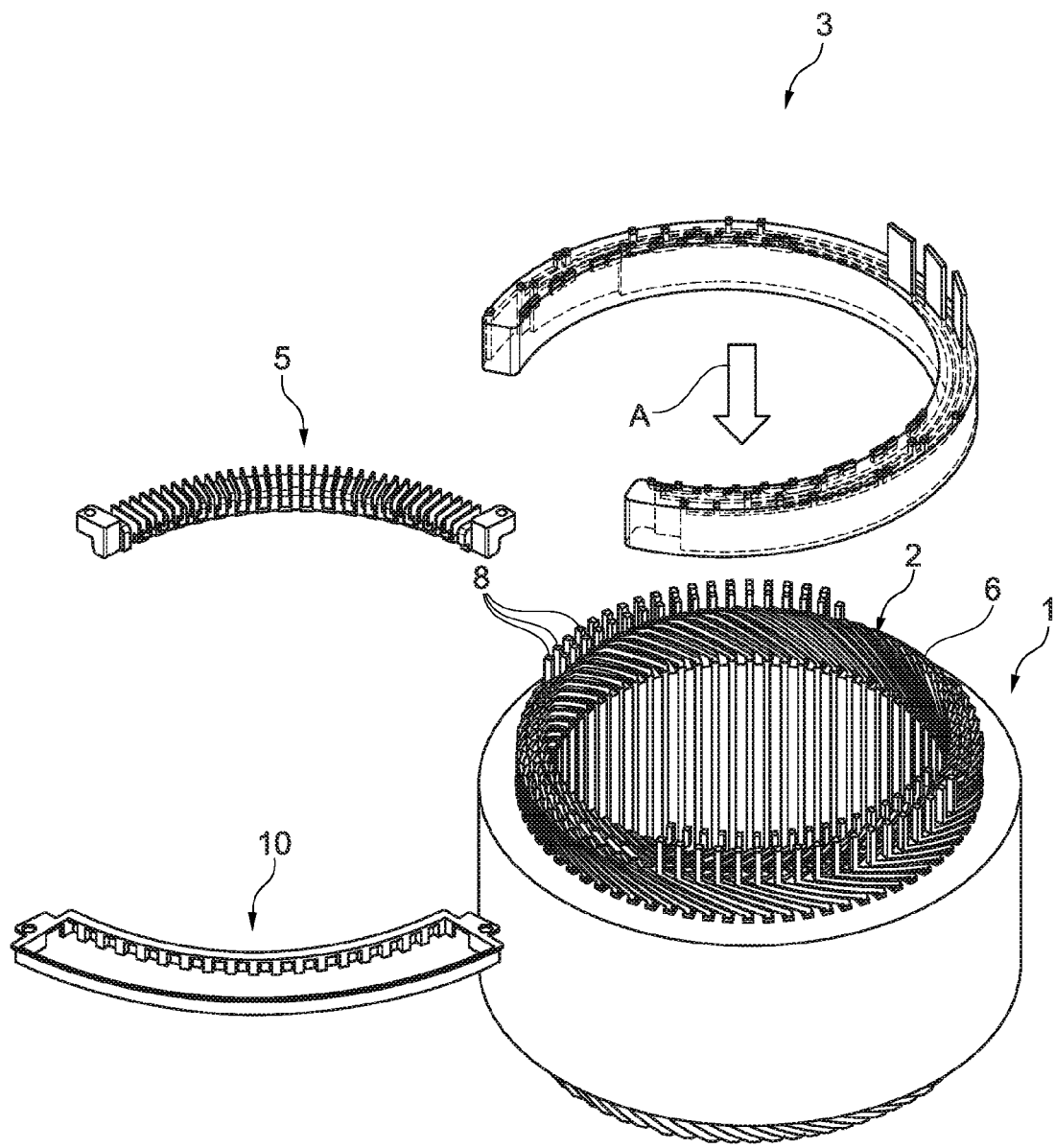
FIG. 18 shows a perspective view of the individual elements that are required for an electrical connection of the winding ends on the winding head.

FIG. 18 shows a perspective view of the individual elements (bending ridge 5, attachment 10 and connection element 3) which are required for an electrical connection of the winding ends 8 on the winding head 2. First, the connection element 3, which comprises multiple busbars $4_1$, $4_2$, $4_3$ and a star bar 40 (see FIG. 1), is positioned in the axial direction A on the winding head 2 of the stator winding 6 of the stator 1. The connection element 3 surrounds a plurality of winding ends 8 on the winding head 2 (see FIG. 6). Before the contact points $7_1$, $7_2$ $7_3$ and 41 and the connection points 51 contact the winding ends 8, a bending ridge 5 is positioned on the connection element 3. Only then are the winding ends 8 bent relative to the bending ridge 5 in order to make electrical contact with the contact points $7_1$, $7_2$ $7_3$ and 41 and connection points 51 of the busbars $4_1$, $4_2$ and $4_3$ of the connection element 3. Finally, the attachment 10 is placed on the bending ridge 5. Finally, an insulation material 12 is introduced into the attachment 10 and the bending ridge 5. The bending ridge 5 and the attachment 10 remain on the stator 1 and also contribute to the insulation of the contact points $7_1$, $7_2$ $7_3$ and 41 and the connection points 51. The cast insulation material 12 provides electrical insulation between the contact points $7_1$, $7_2$ $7_3$ and 41 as well as the connection points 51 and the bent winding ends 8.

List of Reference Symbols
1 Stator
2 Winding head
3 Connection element
$4_1$ First busbar
$4_2$ Second busbar
$4_3$ Third busbar
5 Bending ridge 5R Radius
6 Stator winding
$7_1$ Contact points
$7_2$ Contact points
$7_3$ Contact points
8 Winding end
9 Recess
10 Attachment
$11_1$ Power connection
$11_2$ Power connection
$11_3$ Power connection
12 Insulation material
13 Slot
14 Ridge rim
15 Centering pin
16 Free end
17 Free end
18 Casting frame
19 Casting
20 Device
22 Roller
24 Guide
28 Bending radius
29 Bending edge
40 Star bar
41 Contact point of the star bar
51 Connection point
A Axial direction
B Radial direction

The invention claimed is:

1. A stator for an electric motor, the stator comprising:
a winding head of a stator winding having a plurality of winding ends;
a connection element having multiple busbars and a star bar, from which multiple contact points of the busbars and multiple contact points of the star bar point in an axial direction of the stator, the connection element surrounds the winding ends of the winding head;
the winding ends are bent relative to the contact points of the busbars or to the contact points of the star bar of the connection element and contact at least one of the contact points of the busbars or the contact points of the star bar electrically, by a bending ridge positioned on the connection element; and
an attachment that sits on the bending ridge and comprises an insulation material to provide electrical insulation of the winding ends electrically connected to the contact points of the busbars.

2. The stator according to claim 1, wherein the multiple busbars and the star bar of the connection element are overmolded with an insulation material and the contact points of the individual busbars and the contact points of the star bar protrude beyond the insulation material in the axial direction.

3. The stator according to claim 1, further comprising at least one pair of centering pins is formed on the connection element, which engage in recesses correspondingly formed on the bending ridge, and fixes the bending ridge on the connection element.

4. The stator according to claim 1, wherein the winding ends are welded or clamped or soldered for a permanent electrical connection with the contact points.

5. A method for producing a stator for an electric motor, comprising the steps of:
placing and positioning a connection element, which comprises multiple busbars and a star bar, from which multiple contact points of the busbars and multiple contact points of the star bar protrude in an axial direction of the stator, on the stator such that the connection element surrounds a plurality of winding ends at a winding head of a stator winding of the stator;
positioning a bending ridge on the connection element;
bending the winding ends relative to the bending ridge and contacting the contact points of the busbars and the contact points of the star bar of the connection element electrically; and
placing an attachment on the bending ridge, into which an insulation material is introduced so that electrical insulation between the contact points and the contact points and the electrically connected winding ends is achieved.

6. The method according to claim 5, further comprising carrying out a simultaneous bending of all winding ends relative to the bending ridge with a device, wherein the device has multiple rollers which are moved from an inside in a radial direction outwards over the bending ridge, thereby folding over the winding ends along a bending radius and into grooves in the bending ridge.

7. The method according to claim 5, further comprising welding, clamping, or soldering the bent winding ends of the winding head of the stator to the contact points of the connection element to provide a permanent electrical connection.

8. The method according to claim 5, further comprising automatically placing and positioning each said bending ridge on the connection element, wherein the connection element includes multiple centering pins which engage in recesses formed in the bending ridge.

9. The method according to claim 8, further comprising placing an attachment on the bending ridge and introducing an insulation material into the attachment to achieve electrical insulation of the winding ends electrically connected to the contact points.

10. A stator for an electric motor, the stator comprising:
a winding head of a stator winding having a plurality of winding ends;
a connection element having multiple busbars and a star bar, from which multiple contact points of the busbars and multiple contact points of the star bar point in an axial direction of the stator, the connection element surrounds the winding ends of the winding head;
the winding ends are bent relative to the contact points of the busbars and the contact points of the star bar of the connection element and electrically contact the contact points of the busbars and the contact points of the star bar, by a bending ridge positioned on the connection element; and
at least one pair of centering pins formed on the connection element, which engage in recesses correspondingly formed on the bending ridge, and fixes the bending ridge on the connection element.

11. The stator according to claim 10, wherein the multiple busbars and the star bar of the connection element are overmolded with an insulation material and the contact points of the individual busbars and the contact points of the star bar protrude beyond the insulation material in the axial direction.

12. The stator according to claim 10, wherein the winding ends are welded or clamped or soldered for a permanent electrical connection with the contact points.

13. The stator according to claim 10, further comprising an attachment that sits on the bending ridge and comprises an insulation material to provide electrical insulation of the winding ends electrically connected to the contact points of the busbars.

\* \* \* \* \*